US007318547B2

(12) United States Patent
Gasse

(10) Patent No.: US 7,318,547 B2
(45) Date of Patent: Jan. 15, 2008

(54) METHOD FOR ASSEMBLING PARTS MADE OF MATERIALS BASED ON SIC BY NON-REACTIVE REFRACTORY BRAZING, BRAZING COMPOSITION, AND JOINT AND ASSEMBLY OBTAINED BY SAID METHOD

(75) Inventor: Adrien Gasse, Gren Oble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/221,347

(22) PCT Filed: Mar. 13, 2001

(86) PCT No.: PCT/FR01/00741

§ 371 (c)(1),
(2), (4) Date: Sep. 11, 2002

(87) PCT Pub. No.: WO01/68557

PCT Pub. Date: Sep. 20, 2001

(65) Prior Publication Data

US 2003/0038166 A1    Feb. 27, 2003

(30) Foreign Application Priority Data

Mar. 14, 2000    (FR) .................................. 00 03240

(51) Int. Cl.
*B23K 35/14*    (2006.01)
*C22C 29/18*    (2006.01)
(52) U.S. Cl. ...................... 228/247; 228/194; 228/56.3; 420/578
(58) Field of Classification Search ................ 228/247, 228/194, 198, 56.3; 420/578
See application file for complete search history.

(56) References Cited

U.S. PATENT DOCUMENTS

| 3,813,759 A | | 6/1974 | Heap et al. | |
|---|---|---|---|---|
| 3,926,770 A | * | 12/1975 | Hoekje ........................ | 204/256 |
| 4,499,360 A | | 2/1985 | Rottenbacher | |
| 4,596,354 A | * | 6/1986 | Moorhead ................. | 228/122.1 |
| 4,636,434 A | | 1/1987 | Okamura et al. | |
| 5,021,107 A | | 6/1991 | Holko | |
| 5,340,658 A | | 8/1994 | Komatsu et al. | |
| 5,447,683 A | | 9/1995 | Montgomery et al. | |
| 5,836,505 A | * | 11/1998 | Chaumat et al. ............ | 228/121 |
| 5,975,407 A | | 11/1999 | Gasse et al. | |

FOREIGN PATENT DOCUMENTS

| EP | 0 135 603 | 8/1988 |
|---|---|---|
| EP | 0 342 545 | 5/1989 |
| EP | 0 633 093 | 1/1995 |
| EP | 0 806 402 | 11/1997 |
| FR | 2 707 196 | 1/1995 |
| JP | 61 132570 | 6/1986 |
| RU | 2012466 | 5/1994 |
| RU | 2012467 | 5/1994 |
| WO | WO 86/01446 | 3/1986 |
| WO | WO 97/47568 | 12/1997 |

OTHER PUBLICATIONS

Boadi, T., et al., "Brazing of Pressureless Sintered (PLS) SiC Using AgCuTi Alloy", *J. of Materials Science*, vol. 22, pp. 2431-2434 (1987).
Kalogeropoulou, L., et al., "Relationship Between Wettability and Reactivity in Fe/SiC Sysem", *Acta Metal Mater.* vol. 43, No. 907-912, no date avail.
Lugscheider, E., et al., "Development of New Active Filler Metal for Joining Silicon Carbide and Nitride", *Babs 6th International Conference*, Sep. 3-5, 1991, Stratford-Avon. (English Abstract Only).
Moore, "Feasibility Study of the Welding of SiC", *Communications of the American Ceramic Society*, vol. 68, No. 6, pp. C-151-C-153, (Jun. 1985).
Naka, et al., "Ti-precoating Effct on Wetting and Joining of Cu to Sic", *ISIJ International*, vol. 30, No. 12, p. 1108-1113 (1990).
Tillman, et al., "Herstellungsmoglichkeiten von Hochtemerpaturbestan-digen Verbunden Nichtoxidischer Ingenieurkeramiken mittels Verschiedener Lotkonzepte", *Brazing-High Temperature Brazing and Diffusion Welding*, Aachen, 27-29, June DVS Verlag GmbH Dusseldorf, pp. 110-114, 1995.
French Search Report dated Oct. 23, 2000.

* cited by examiner

*Primary Examiner*—Kevin P. Kerns
(74) *Attorney, Agent, or Firm*—McKenna Long & Aldridge LLP

(57) ABSTRACT

Method for assembling at least two pieces of silicon carbide based materials by non reactive refractory brazing, wherein these pieces are put into contact with a non reactive brazing solder composition and the assembly formed by the pieces and the brazing solder composition is heated to a brazing temperature sufficient to fuse the brazing solder composition in order to form a refractory joint, in which the non reactive brazing solder composition is constituted, in atomic percentages, of from 40 to 97% silicon and of from 60 to 3% of another element chosen in the group consisting of chromium, rhenium, vanadium, ruthenium, iridium, rhodium, palladium, cobalt, platinum, cerium and zirconium and wherein, before brazing, a strengthening agent of SiC and/or C is added.

Brazing solder composition, composition for refractory brazing. Refractory joint and assembly obtained by the method.

7 Claims, No Drawings

METHOD FOR ASSEMBLING PARTS MADE OF MATERIALS BASED ON SIC BY NON-REACTIVE REFRACTORY BRAZING, BRAZING COMPOSITION, AND JOINT AND ASSEMBLY OBTAINED BY SAID METHOD

The present invention relates to a method for assembling pieces of silicon carbide based materials by non reactive refractory brazing with a non reactive brazing solder composition consisting of a silicon base plus another element, in order to produce components entirely in silicon carbide. The invention furthermore relates to particular brazing solder compositions, and to the refractory joint and assembly obtained by this method.

The term "silicon carbide based materials", generally includes all materials with SiC content greater than or equal to 80% by weight.

The technical field of the invention can be defined as being high temperature brazing, meaning that it applies temperatures which are generally higher than 1200° C., thus permitting use of the obtained assembly in applications requiring temperature rises which may, for example, exceed 900° C. and reach 1600° C. and even more.

It is known that it is difficult to manufacture ceramic pieces of large dimensions, in SiC in particular. In fact, the tolerances after sintering the primary components of large dimensions in silicon carbide are poorly controlled and machining these components is unacceptable for reasons of cost.

Furthermore, and for the same reasons, it is generally difficult to manufacture pieces of complex shape with silicon based compounds, such as silicon carbide.

Thus it is often preferable to manufacture pieces or structures of large dimensions and/or of complex shape using ceramic elements of simple shape and/or small size, and then to assemble these elements to produce the final structure.

Such a technique is especially necessary for manufacturing structures of the heat exchanger type, burners, thermal resistances of structural components in silicon carbide having an operating temperature as high as, for example, 1600° C.

Because of the high temperatures, close to 1000° C. for example, used in the applications of ceramics such as silicon carbide, assembly of these ceramics by gluing with organic products is excluded.

In addition, conventional assembly techniques by welding with application of an energy beam, with or without metal filler (TIG, electron or laser welding) and requiring partial fusion of the pieces to be assembled, cannot be used for assembling ceramics since it is not possible to fuse a ceramic substrate or piece and since, in particular, silicon carbide decomposes before fusion.

Consequently, welding by solid phase diffusion, sintering-assembly, and reactive brazing are at present the most widely used techniques for producing refractory assemblies of ceramics.

Solid phase diffusion welding, together with sintering-assembly have the disadvantage of being restricted from the point of view of implementation.

For solid phase diffusion welding, the shape of the pieces must remain simple if uniaxial pressing is used, or otherwise requires complex equipment and preparation comprising, for example, the manufacture of an envelope, sealed closure under vacuum, hot isostatic compression, and final machining of the envelope, if HIP is used (Hot Isostatic Pressing).

In the case of sintering-assembly, the same problems remain (shape of the pieces, complex implementation) with, in addition, the need to control the sintering of a powder filler to be inserted between the two materials to be assembled.

Furthermore, these two techniques require the utilisation of long time spans (one of several hours) at high temperature since the process used involves solid state diffusion.

Brazing is a low cost technique, easy to implement, and is the most usual method applied at present. Pieces of complex shape can be produced by using capillary brazing and the operations are limited to placing the metal filler or alloy, called "brazing solder" between or close to the joint and to fusing the brazing solder to obtain the junction between the two pieces after cooling.

The brazing of ceramics must overcome the fundamental problem of poor wettability of ceramics by liquid metals. This problem is solved by selecting special alloy compositions and/or possibly by adding a reactive agent, as in the case for brazing, called reactive brazing.

In the latter technique a metallic alloy composition is used, usually copper and silver based, and a reactive element such as Ti, Zr, V, Hf, Nb etc. is added.

The reactive agent acts by surface decomposition of the ceramic and reaction with the latter to form a very stable compound of nitride, oxide, silicide or carbide according to the nature of the ceramic in question. This layer generally permits very good wettability of the ceramic and satisfactory adherence to it.

Thus the document EP-A-0 135 603 (GTE Products Corporation) describes a ductile alloy for brazing comprising 0.25% to 4% of a reactive metal chosen in the group consisting of titanium, vanadium, zirconium and their mixtures, of from 20 to 85% silver, of from 1 to 70% copper or aluminium, and of from 3 to 30% palladium.

The document by E. Lugscheider and W. Tillmann "Development of New Active Filler Metal for Joining Silicon Carbide & Nitride"—Babs 6th International Conference—Sep. 3-5, 1991—Stratford-upon-Avon, indicates that ceramics of the non-oxide type such as $Si_3N_4$ and SiC can be assembled together using brazing solders with a base of copper, silver and a reactive metal chosen in the group consisting of titanium, zirconium, hafnium and niobium.

The document by W Tillmann et al. "Herstellungsmöglichkeiten von hochtemperaturbeständigen Verbunden nichttoxidischer Ingenieurkeramiken mittels verschiedener Lotkonzepte" "Brazing-High Temperature Brazing and Diffusion Welding", Aachen, 27-29 June, DVS Verlag GmbH, Düsseldorf, p. 110-114, 1995, describes mixtures for brazing non-oxide ceramics, essentially palladium and platinum based, with iron, nickel or cobalt added.

The reactive metal, such as titanium, can also be deposited beforehand on the silicon carbide by techniques such as CVD (chemical vapour-phase deposit) or PVD (physical vapour-phase deposit), as described in the document by M. Naka et al. "Ti-precoating Effect on Wetting and Joining of Cu to SiC"; ISIJ International, Vol. 30 (1990), No. 12, p. 1108-1113 relative to the assembly of pieces of SiC by brazing solders of copper.

Reactive brazing is adapted to assembly of oxide ceramics such as aluminium, since the reactivity is limited and the mechanical behaviour of the oxides formed is satisfactory.

In the case of non-oxide ceramics such as carbon or silicon nitride, the reactivity between the active elements and the ceramic is especially disturbed; the latter induces formation of brittle intermetallic compounds such as silicides and carbides in the case of SiC, significant porosity and cracks extending into the ceramic, which very seriously limits the mechanical resistance of the assemblies thus formed.

These phenomena are referred to in the document by J. K. Boadi, T. Yano, T Iseki: Brazing of PressureLess Sintered (PLS) SiC using AgCuTi alloy", J. of Materials Science, Vol. 22, 1987, p. 2431-2434 related to brazing SiC with itself, obtained by sintering without pressure (pressureless-sintered or PLS SiC), with the aid of a brazing solder with an Ag—Cu base with titanium as reactive metal. This document emphasises the fragility of the assembly at high titanium content together with the formation of intermetallic compounds when the temperature and contact time are raised.

Furthermore, the fusion point of the brazing solders described above restricts the operating temperature to 600-700° C., which is clearly insufficient for high temperature applications approaching 1000° C. or more and, for example, up to 1600° C.

Another significant problem encountered during the assembly of ceramics with each other is the fact that these ceramics are brittle and practically without any deformability, even at high temperatures.

It is therefore essential, when producing a ceramic assembly, to limit the residual stresses which develop during cooling due to an expansion coefficient differential between the two pieces to be assembled if their nature is different, but also between the ceramic and the brazing solder in the case of an assembly of two ceramics of the same nature. Thus, the thermal expansion coefficient of the brazing solder must correspond closely to that of the ceramic pieces to be assembled.

The alloy compositions currently used with a base of Cu and Ag are ductile, but with limited operating temperature, as indicated above, and they therefore do not provide a satisfactory solution to this problem.

Thus, in particular, in order to provide a solution to this problem and to enable the production of satisfactory assemblies with ceramics containing silicon, brazing solders with metallic silicides have been developed.

Thus, the document U.S. Pat. No. 4,499,360 (DORNIER SYSTEM GmbH) which corresponds to the documents of patent DEA-3 230 320; JP-A-59(84)09 7580 and to the patent EP-A0 100 835 describes a brazing solder for assembling SiC based pieces constituted of from 20 to 45% by weight of cobalt and of from 80 to 55% by weight of silicon. Although this document mentions refractory brazing of silicon carbide in general, it is fundamentally a question in this patent of brazing silicon carbide pieces impregnated with or in silicon carbide "reaction bound" (RBSC=Reaction Bonded Silicon Carbide, or SiSiC), that is in a composite ceramic constituted by silicon carbide (SiC) and with up to 30% by weight of silicon (Si). The method according to this document is for example, implemented to assemble two tubes in SiSiC. The thickness of the joint obtained is each time of low thickness of from 5 to 10 microns.

The brazing solder formula proposed by this document does not satisfy the demands required for producing very refractory joints.

In fact, the brazing solder compositions described in this document are adapted to Si—SiC with brazing temperatures lower than 1400° C.

However, it has been demonstrated in patent WO-A97/47568 that, for the brazing solder expansion coefficient to be adapted to that of SiC with the Co—Si system, it is essential that the proportion of Si in the brazing solder, whose expansion coefficient is close to that of SiC ($\alpha_{si}$ 5.10$^{-6}$ K$^{-1}$) should be greater than or equal to 80% by weight. The intermetallic brazing solder, described in this document, is thus comprised of from 1 and 18% by weight of cobalt and of from 82 and 99% by weight of silicon and, in particular, makes it possible to produce thick joints, but it still limits the utilisation to a temperature lower than 1400° C. In addition, the known brittleness of these silicides makes them particularly vulnerable to the propagation of cracks from mechanical forces during operation.

Document U.S. Pat. No. 3,813,759 relates to the assembly of silicon carbide based ceramics with each other, with the aid of brazing solders consisting of an alloy of silicon (at least 5%) with one or several metals chosen in the group consisting of germanium, iron, gold, platinum, nickel, palladium, chromium and titanium.

In fact, in this document, similar restrictions can be found as in the above-mentioned document U.S. Pat. No. 4,499,360. In fact, the brazing solder composition has a fusion temperature which must not exceed 1400° C. and it serves only for assembling pieces of Si—SiC at operating temperature lower than 1400° C. Moreover, the time periods needed for brazing, that is the time during which the pieces and the brazing solder have to be maintained under brazing conditions must necessarily be longer than 1 hour; in the examples, extremely long brazing times up to 16 hours are described.

Furthermore, the experience of the inventors with these alloys has shown that, to ensure that the expansion coefficient of these alloys is adapted to SiC, the silicon content must be very high. This is confirmed by claims 1, 6 and 7 of this document, wherein the composites, described in the Cr—Si and Ti—Si systems with high Si content corresponding to expansion properties, have respective contents in Si of 75 and 78% by weight. This document thus describes very specific brazing compositions, selective, with intrinsic coefficient adapted uniquely to the particular SiC to be brazed. As a result, the method related to this document is very limited. Furthermore, the joints obtained are subject to cracking due to residual thermomechanical stresses suffered during processing and their toughness leaves much to be desired.

The same observations are valid for the document WO-A-86/01446 which describes brazing solder compositions among which only the compositions of specific brazing solders Si—SNb, Si-30Nb, and Si-30Ta are tested for their wettability on SiC, and no assembly is prepared.

Despite the high reactivity of silicon carbide with transition metals, the metal silicides mentioned above have the advantages of being non reactive relative to silicon carbide when the composition is sufficiently rich in silicon. Moreover, these silicides possess good resistance to oxidation in air at high temperature.

Nonetheless, these silicides must be used with good prior knowledge of the interfaces between the silicides and the SiC. In fact, if alloys of the Co—Si, Ni—Si type, for example, have the property of forming a strong interface with SiC, this is not at all the case for the Fe—Si system for example, as described in the document of S. Kalogeropoulou, L. Baud, N. Eustathopoulos: "Relationship between wettability and reactivity in Fe/SiC system"; Acta metal. Mater., vol. 43, 907, (1995), which demonstrates the facts that Fe reacts strongly with the silicon carbide, that Si added to the iron leads to a significant reduction of reactivity if the Si content exceeds a so-called critical value and that adherence is not satisfactory.

It therefore seems that the formulation of a brazing solder composition with a metallic silicide base is relatively unpredictable and that its properties can certainly not be deduced from the properties of known brazing solders.

Furthermore, as described above, the brazing coefficient must be adapted to that of the ceramic such as SiC, since these metallic silicides, which are defined compounds, have no ductility.

Document U.S. Pat. No. 5,447,683 (GENERAL ATOMICS) describes joints for brazing assembly at high temperature of dense ceramic blocks in silicon carbide. The brazing solders according to this document have a thermal expansion coefficient compatible with that of silicon carbide and comprise silicon in a proportion which is imperatively lower than 50% by weight plus at least two other elements selected in the group consisting of Li, Be, B, Na, Mg, P, Sc, Tc, V, Cr, Mn, Fe, Co, Zn, Ga, Ge, As, Rb, Y, Sb, Te, Cs, Pr, Nd, Ta, N and Tl; Fe, V, Co and Cr being preferred. A particularly preferable brazing solder contains from 10 to 45% Si and from 30 to 65% Co.

A proportion of Si less than 50% by weight is clearly insufficient for controlling the reactivity with SiC of the alloys mentioned in this document. Moreover, a high presence of the elements quoted above raises the expansion coefficient of the brazing solder considerably.

The experience of the inventors with this type of alloy has shown that such alloys are not adapted to refractory brazing of SiC, both for reasons of chemical compatibility: these alloys are too reactive because of too low a silicon content, and for mechanical reasons; their expansion coefficient is too high. Furthermore, the assemblies described are not sufficiently refractory (1200° C. to 1500° C.) and necessarily contain at least two metals, apart from Si.

The document FR-A-2 707 196 (CEA) describes an assembly method for molybdenum or tungsten together or with ceramics such as silicon carbide, by brazing.

The brazing solder used is comprised of from 39 to 98% by weight of silicon and the brazing solders used in the examples are comprised of from 49 and 62% by weight of silicon.

This document only concerns heterogeneous assemblies of the metal/ceramic type and does not treat either the specific problems of homogeneous assemblies of two ceramics of the same nature such as SiC, or the production of thick joints.

The document U.S. Pat. No. 5,340,658 mentions the use of brazing solders comprising various elements including silicon for assembling carbon-carbon composites. These alloys are reactive, and not very refractory, that is to say that they have fusion temperatures lower than 1000° C. This means that they are outside the domain of this invention.

The document U.S. Pat. No. 5,021,107 relates to a method for assembling, or coating, pieces of carbon-carbon composite, wherein an interface material is used with a fusion temperature higher than 2500° F. (1370° C.), sandwiched between the two surfaces to be assembled. The assembly is maintained by compression and is heated to a temperature sufficiently high to fuse the interface material or to provoke diffusion between the interface material and the composite carbon-carbon material.

Among the interface materials, various metals are named, such as Ti, Zr, Mo and Si, B, Nb, W, Ni, Cr, V, Ti and their carbides, for example SiC.

These compounds can be very refractory, that is to say that the brazing temperature can be up to about 2000° C., but they are also very reactive with the carbon-carbon composites. This document is outside the domain of this invention, since it relates to carbon-carbon composites and not to SiC based materials.

The document EP-A-0 342 545 concerns a brazing solder in sheet form, with a thickness of 20 to 120 µm, with a structure at least partially amorphous constituted of an alloy with a composition in atomic percentages of from 20 to 50% iron, of from 5 to 20% chromium, of from 10 to 30% nickel, of from 5 to 20% boron and of from 0 to 30% silicon carbide. This brazing solder can, in particular, be used for the refractory assembly of pieces of silicon carbide with each other or with metals, such as nickel, iron and titanium.

The brazing temperatures range from 900° C. to a maximum of 1300° C. and the alloys used are reactive with silicon carbide.

The document RU-A-20 112 466 mentions utilisation of a brazing solder for the assembly of pieces of SiC, containing the three elements Cr, Ce and Si in the following proportions in percentage by weight: Cr of from 21 to 24%, Ce of from 3 to 7% and the remainder in Si. The brazing temperature is comprised between 1360° C. and 1400° C.

The document RU-A-2 012 467 describes the utilisation of a brazing solder for the assembly of pieces of SiC, containing the three elements Ti, Ce and Si in the following proportions in percentage by weight: Ti of from 18 to 22%, Ce of from 3 to 7% and the remainder in Si. The brazing temperature is comprised between 1360° C. and 1400° C.

It has been seen above that, as for all ceramic techniques, it is difficult to manufacture pieces of complex shape in silicon carbide, and it is therefore often necessary to manufacture structures from ceramic elements of simple shape, and then to assemble them to produce the final structure.

Moreover, the manufacture of technical ceramic pieces with precise dimensions still remains very poorly mastered and machining of such pieces is unacceptable, in particular for cost reasons.

Therefore, at present, there is a need for a method making it possible to produce, by brazing, between two ceramics of the same nature, such as SiC, strong but also very refractory bonds, meaning that they are able, in particular, to withstand temperatures possibly as high as 1600° C. or even higher.

None of the brazing methods and brazing solder compositions described in the prior art documents corresponds to this requirement.

In particular, none of the methods and compositions of prior art simultaneously fulfils the following criteria, drawn up by the inventors and which are fundamental for making structural components in ceramic, such as SiC, involving joints, in particular thick joints, and very refractory.

1. The brazing solder composition must enable the production of a strong bond between the two pieces of ceramic such as silicon carbide, which involves a non reactive brazing composition, meaning chemically compatible with silicon carbide.
2. The brazing solder composition must be able to wet the silicon carbide well and to adhere to it well.
3. The brazing solder composition must have an expansion coefficient adapted to SiC, that is to say close to its expansion coefficient, to suppress any residual stress which could appear within the joint during cooling and to guarantee that there are no incipient cracks, which would harm the mechanical performance of the assembly.
4. The brazing solder composition must be constituted of a limited number of elements, in order to facilitate its preparation and its implementation.

5. Finally, the joints must be very refractory, that is with a very high brazing temperature, for example, from 1250° C. to 1850° C., enabling them to resist working temperatures of 1600° C. and over.

Furthermore, the method must enable the brazing and the assembly of all types of ceramics and must be easily adaptable to any specific silicon carbide based ceramic.

The aim of the invention is therefore to provide an assembly method by brazing pieces or components in silicon carbide based materials which satisfies, among other things, the requirements and criteria listed above, which eliminates the disadvantages, defects and limitations met using prior art methods, and which makes it possible to produce very refractory joints, with high toughness and exempt from cracking both during production of the joint and under working conditions.

This aim, and other aims as well, are achieved according to the invention by an assembly method for at least two pieces of silicon carbide based materials by non reactive refractory brazing, wherein these pieces are put into contact with a non reactive composition of brazing solder and the whole assembly formed by the pieces and the brazing solder composition is heated to a brazing temperature sufficiently high to fuse the brazing composition in order to form a refractory joint, wherein the non reactive brazing solder composition is constituted, in atomic percentages, of from 40 to 97% silicon, and of from 60 to 3% of another element selected in the group consisting of chromium, rhenium, vanadium, ruthenium, iridium, rhodium, palladium, cobalt, platinum, cerium and zirconium and wherein, before brazing, a strengthening agent of SiC and/or C is added.

The method according to the invention answers these needs, satisfies the above-mentioned requirements and criteria as a whole, and does not present the disadvantages of prior art methods, thus making it possible to prepare very refractory joints.

The inventors have shown, in an unexpected manner, that to fulfil the above-mentioned criteria, and in particular for the composition of the brazing solder to be both very refractory but not reactive with the SiC, the specific range of atomic percentages given above has to be respected.

The very refractory specific silicides used in the method according to the invention have, in general, an expansion coefficient higher than that of SiC, and their non reactive composition range could not, a priori, be envisaged at all.

These silicides are simple, since they are binary and non-tertiary silicides, or even more complex, such as those used in many prior art documents. Their preparation is therefore easier.

The domain of the brazing solder composition according to the invention making it possible to produce very refractory joints between two ceramic pieces of the same nature in SiC is neither mentioned nor suggested in the prior art described above.

The method according to the invention has the advantage of leading to very refractory assemblies able to withstand high temperatures rising, in air, up to 1600° C. or beyond, since the brazing temperature is also from 950 to 1850° C., and the fusion temperature of the compositions (solidus) generally varies from 900° C. to 1820° C.

According to the invention, the brazing solder compositions implemented must generally have a silicon content greater than or equal to 40% in atomic percentage in order to be non reactive with SiC.

To ensure that the expansion coefficient of the brazing solder is close to, but greater than, that of silicon carbide, the percentage of silicon must preferably not exceed 97% in atomic percentage.

A method implementing the brazing solder compositions with atomic percentages within the above-mentioned range is a simple operation, because these compositions are non reactive, on the sub-micron scale and possess very good wettability and adherence properties on SiC. The brazing solder composition, in itself, is not expensive because it only contains low cost elements.

All the joints obtained by the method according to the invention have very good mechanical strength defined, for example, by a very high $\sigma_r$, and during a mechanical test, the rupture always takes place in one of the SiC substrates but never in the joint itself.

Given the non reactive properties of the brazing solder composition according to the invention, it is possible to dissolve the brazing solder if necessary and to proceed with another brazing. Since there is no reaction between the brazing solder and the SiC, a re-brazing such as a repair is possible.

Besides implementation of a specific, non reactive brazing solder composition, the second essential characteristic of the method according to the invention is that, before brazing, a strengthening agent of SiC and/or C is added.

First and foremost, it must be noted that use of such a strengthening agent, which furthermore is in conjunction with a non reactive brazing solder composition, is neither revealed nor suggested in prior art. Addition of a strengthening agent of SiC and/or C enables perfect adaptation of the joint composition coefficient including the strengthening agent plus the brazing solder, to the SiC based material. Following the method according to the invention, it is possible to braze all known SiC based materials, which is not the case for prior art methods; for example, the method according to the invention makes it possible to braze SiC based ceramics and composites. Contrary to the procedure followed in prior art, the brazing solder compositions used in the method according to the invention generally have an intrinsic expansion coefficient non-adapted to the SiC based material and it is precisely by adding a strengthening agent of SiC and/or C that it becomes possible to adapt the overall expansion of the joint to that of the SiC based material to be assembled. Thus, it is possible to use not only particular compositions, as in document U.S. Pat. No. 3,813,759, or document WO-A-86/01446, but also a wide range of compositions with, in particular, most compositions with fusion point higher than 1400° C.

By adapting the expansion exactly, the strengthening agent makes it possible, not only to suppress any possible cracking due to residual thermomechanical stresses from production of the joints, but also to obtain a composite joint with reinforced and extremely high toughness.

In other terms, on the one hand the non reactive brazing solder compositions implemented in the method according to the invention, ensure excellent chemical compatibility with the SiC based material, wet it well and adhere well to it. On the other hand, in order to limit residual stresses which appear during cooling, due to the difference in expansion coefficient between the material and the brazing solder, the overall composition of the joint includes, according to the invention, a metal-silicon alloy and a strengthening agent of SiC and/or C, with expansion coefficient close to that of the SiC based material. This is especially true when the thickness of the joint increases or when the mechanical stress is high. Due to the method according to the invention, all induced cracking is avoided both during production of the joint and during working operation of the assembly, which would be very detrimental to the lifetime of the part or component.

Apart from the advantages already described above, it can be noted that the composition of the brazing solder applied in the invention is a silicide whose high Si content raises its resistance to oxidation by formation of a superficial layer of silicon.

The brazing solder applied according to the invention also has the advantage of having low sensitivity to corrosion, for example by oleum or nitric acid, and to oxidation.

Furthermore, contrary to conventional reactive brazing solders, the quality of the atmosphere of the brazing furnace is less critical, since wetting is immediate even with atmospheres containing a non-negligible partial pressure of oxygen such as, for example, with argon of commercial quality, thus the brazing can be carried out under vacuum or under the simple protection of an inert gas, but also using reducing gases, such as hydrogen.

Other advantages of the method according to the invention can also be mentioned:
  short brazing times, for example only 5 to 15 minutes, contrary to solid phase diffusion, which requires much longer time lengths. Furthermore, the brazing time parameter is no longer critical and if necessary, for example in the case of brazing pieces of large dimension, with a furnace thermal inertia, the brazing time can easily be extended or adapted;
  great simplicity, involving only low overall costs for the method, The preferred brazing compositions in the method according to the invention are the following:
  of from 50 to 97 atomic percentage of silicon, of from 50 to 3 atomic percentage of chromium, which corresponds for these compositions to mass quantities of from 34 to 94.5% by weight of silicon and of from 66 to 5.5% by weight of chromium, the brazing temperature of these compositions generally being over 1400° C. and up to 1550° C.;
  of from 40 to 97 atomic percentage of silicon and of from 60 to 3 atomic percentage of rhenium, which corresponds for these compositions to mass quantities of from 9 to 82.5% by weight of Si and of from 91 to 17.5% by weight of rhenium;
  of from 55 to 97 atomic percentage of silicon and of from 45 to 3 atomic percentage of vanadium, which corresponds for these compositions to mass quantities of from 40 to 95% by weight of silicon and of from 60 to 5% by weight of vanadium;
  of from 60 to 97 atomic percentage of silicon and of from 40 to 3 atomic percentage of zirconium, which corresponds for these compositions to mass quantities of from 31 to 95% by weight of silicon and of from 69 to 5% by weight of zirconium;
  of from 45 to 97 atomic percentage of silicon and of from 55 to 3 atomic percentage of ruthenium, which corresponds for these compositions to mass quantities of from 20 to 90% by weight of silicon and of from 80 to 10% by weight of ruthenium;
  of from 48 to 97 atomic percentage of silicon and of from 52 to 3 atomic percentage of iridium, which corresponds for these compositions to mass quantities of from 12 to 82.5% by weight of silicon and of from 88 to 17.5% by weight of iridium;
  of from 50 to 97 atomic percentage of silicon and of from 50 to 3 atomic percentage of rhodium, which corresponds for these compositions to mass quantities of from 21.5 to 90% by weight of silicon and of from 78.5 to 10% by weight of rhodium;
  of from 50 to 97 atomic percentage of silicon and of from 50 to 3 atomic percentage of palladium, which corresponds for these compositions to mass quantities of from 21 to 89.5% by weight of silicon and of from 79 to 10.5% by weight of palladium;
  of from 58 to 97 atomic percentage of silicon and of from 42 to 3 atomic percentage of cobalt, which corresponds for these compositions to mass quantities of from 40 to 95% by weight of silicon and of from 60 to 5% by weight of cobalt;
  of from 50 to 97 atomic percentage of silicon and of from 50 to 3 atomic percentage of platinum, which corresponds for these compositions to mass quantities of from 12.5 to 82% by weight of silicon and of from 87.5 to 18% by weight of platinum;
  of from 53 to 97 atomic percentage of silicon and of from 47 to 3 atomic percentage of cerium, which corresponds for these compositions to mass quantities of from 18 to 90% by weight of silicon and of from 82 to 10% by weight of cerium.

The method according to the invention generally comprises the steps of forming a powder of the brazing solder composition, of putting this powder into suspension in an organic binder and of coating the areas of the pieces to be assembled with the obtained suspension, and by adding a strengthening agent of SiC and/or C, prior to brazing.

The brazing solder composition can be applied between and/or close to the pieces to be assembled.

Adding SiC and/or C has a particular aim, as mentioned above, that of raising the toughness of the assembly and of adapting the expansion coefficient of the brazing solder to that of the SiC to be assembled, generally by reducing the expansion coefficient of the brazing solder. This added SiC and/or C is, generally, carried out with a quantity of from 5 to 60% by weight of SiC and/or C relative to the weight of the brazing solder composition (that is of the Si+metal assembly) described above.

It is noted that the lower the proportion of Si in the brazing solder, the higher the proportion of strengthening agent needed (this depends on the expansion coefficient of the silicide) to compensate for the rise in the expansion coefficient related to the metal. Thus, depending on the expansion coefficient of the different Si and metal alloys, it is necessary to have a varying proportion of strengthening agent, generally a minimum of 5% by weight.

A strengthening agent of SiC and/or C can be added in various ways, by adding the strengthening agent of SiC and/or C to the brazing solder composition, prior to brazing, or by placing the strengthening agent close to and/or on and/or between the pieces to be assembled. Preferably, the brazing (Si+metal) is placed externally to the joint formed by the surfaces put into contact and close to the joint, and the strengthening agent is placed between the pieces to be assembled. The strengthening agent can be used under any suitable form chosen from: powder, grains, pieces and particles of diverse shapes, fabric, non-woven fabric, felt, foam etc.

Thus, more precisely:
  the SiC and/or C powder can be mixed directly with the brazing solder composition;
  the SiC and/or C powder can be put into suspension in an organic binder and the pieces to be assembled can be coated with the obtained suspension;

particles of SiC and/or C can be added to the brazing solder composition;

finally, the strengthening agent can be inserted, for example in the form of fabric, a nonwoven fabric, a felt or a foam of silicon carbide and/or carbon, between the pieces to be assembled.

Adding SiC and/or C makes it possible to obtain joints with high toughness resulting from the presence of SiC and/or C particles or of a SiC and/or C fabric in the joint.

To differentiate particles from powder, one can indicate that the granulometry of the latter is lower.

The invention also relates to a non reactive brazing solder composition selected from the group :

a brazing solder composition constituted, in atomic percentages, of from 40 to 97% silicon and of from 60 to 3% rhenium;

a brazing solder composition constituted, in atomic percentages, of from 45 to 97% silicon and of from 55 to 3% ruthenium;

a brazing solder composition constituted, in atomic percentages, of from 48 to 97% silicon and of from 52 to 3% iridium;

a brazing solder composition constituted, in atomic percentages, of from 50 to 97% silicon and of from 50 to 3% palladium;

a brazing solder composition constituted, in atomic percentages, of from 50 to 97% silicon and of from 50 to 3% platinum;

a brazing solder composition constituted, in atomic percentages, of from 53 to 97% silicon and of from 47 to 3% cerium;

The invention also relates to a composition for non reactive refractory brazing of pieces of silicon carbide based materials comprising a non reactive brazing solder composition, such as defined just above or a composition selected from the following compositions:

a brazing solder composition constituted, in atomic percentages, of from 50 to 97% silicon and of from 50 to 3% chromium;

a brazing solder composition constituted, in atomic percentages, of from 55 to 97% silicon and of from 45 to 3% vanadium;

a brazing solder composition constituted, in atomic percentages, of from 60 to 97% silicon and of from 40 to 3% zirconium;

a brazing solder composition constituted, in atomic percentages, of from 50 to 97% silicon and of from 50 to 3% rhodium;

a brazing solder composition constituted, in atomic percentages, of from 58 to 97% silicon and of from 42 to 3% cobalt;

and, furthermore, a strengthening agent of SiC and/or C.

Furthermore, the invention relates to the refractory joint, and the assembly comprising at least two pieces of SiC based materials, obtained by the method described above.

Other properties and advantages of the invention will be understood more clearly by reading the following description, given as an illustrative and non-limiting example.

The method according to the invention consists, first of all, of preparing a brazing solder composition containing silicon plus another element chosen in the group consisting of chromium, rhenium, vanadium, zirconium, ruthenium, iridium, rhodium, palladium, cobalt, platinum or cerium, in the required proportions as indicated above.

The composition of the brazing solder is, generally, a pulverulent composition which can be prepared, for example, by first of all synthesizing, from pure elements, an intermetallic compound containing silicon and another element chosen in the group consisting of chromium, rhenium, vanadium, zirconium ruthenium, iridium, rhodium, palladium, cobalt, platinum, or cerium.

Synthesis of such an intermetallic composition can be carried out, for example, by introducing silicon—for example in the form of pieces—and another element chosen in the group consisting of chromium, rhenium, vanadium, zirconium ruthenium, iridium, rhodium, palladium, cobalt, platinum, or cerium—for example in the form of wire, pieces or other—in a refractory crucible made of alumina, for example, by heating, for example, to a temperature of from 1250° C. to 1850° C., to fuse the different constituents of said composition and to obtain the final, homogeneous, intermetallic compound required. The intermetallic compound obtained is then ground in any suitable apparatus, for example in a mortar to obtain a powder with appropriate granulometry, that is to say that, for example, the grains have a diameter of from 1 to 250 μm.

Instead of being synthesized, said intermetallic compound can be a compound available commercially under the form of an intermetallic compound powder of known granulometry and purity. Among these commercial powders, one can mention, for example: powder of the $CrSi_2$ compound, trademark CERAC®, 99.5% pure and with granulometry lower than 10 μm; powder of the $VSi_2$ compound, trademark CERAC®, 99.5% pure and with granulometry lower than 45 μm; powder of the $ZrSi_2$ compound, trademark CERAC®, 99.5% pure and with granulometry lower than 45 μm; powder of the $CeSi_2$ compound, trademark CERAC®, 99.5% pure and with granulometry lower than 10 μm; and the powder of composition $Re_5Si_3$, trademark GOODFELLOW®, 99.5% pure and with granulometry lower than 40 μm. This powder constituted of two intermetallic compounds can be used as such as a brazing solder composition.

However, in order to adjust the Si content of the brazing solder composition, it may be necessary to mix one of these above-mentioned intermetallic compound powders with pure silicon powder. This pure silicon powder can be prepared from pieces of pure silicon ground in any suitable apparatus, for example in a mortar, to obtain a powder with appropriate granulometry with grains, for example, of a diameter of from 1 to 250 μm.

Instead of being prepared in this way, said pure silicon powder can also be a commercially available powder with known granulometry and purity. Among these commercially available powders one can mention, for example: the powder of pure Si, trademark CERAC®, 99.5% pure or 99.99% pure and with granulometry lower than 10 μm.

The powder composed of the mixture of intermetallic compound powders and Si constitutes, in this case, the brazing solder composition.

Furthermore, according to the invention, a strengthening agent of SiC and/or C is added before brazing. As indicated above, the SiC and/or C strengthening agent can added in different ways.

For example, since the composition of the brazing solder has a high expansion coefficient, SiC and/or C powder is added to it, in particular to lower the expansion coefficient and to adjust the toughness of the assembly. This is the case, in particular, when the Si content in the brazing solder composition is not sufficiently high for the expansion coefficient of the brazing solder to be adapted to that of the SiC of the pieces to be assembled. The added SiC and/or C generally represents from 5 to 60% by weight of the brazing solder composition. For example, the SiC powder can be a commercially available powder, such as the STARCK® trademark powder, with 98.5% purity and granulometry lower than 10 µm.

The brazing solder composition powder (Si plus metal), possibly with added SiC and/or pure C powder, is put into suspension in the conventional way in a liquid organic binder, preferably relatively viscous, which decomposes for example between 100 and 300° C. without leaving any traces. It can also consist of, for example, a cement of the NICROBRAZ® type.

The two surfaces of the pieces to be assembled, in SiC based materials, are degreased in an organic solvent for example of the ketone, ester, ether or alcohol type, or a mixture of these etc., a preferred solvent being acetone or an acetone-alcohol ethylic-ether mixture, for example in proportions 1/3, 1/3, 1/3; and then dried.

The pieces to be assembled, in SiC based materials, are generally two in number, but it is also possible to assemble a greater number of pieces simultaneously, able to reach up to 100.

By piece of SiC based materials, one generally means any element, entity or shape whatsoever entering, for example, after assembly with one or several other pieces, into structures of greater dimensions.

As examples of SiC based materials, one can mention pure dense silicon carbide or PLS-SiC (PressureLess Sintered SiC); Si infiltrated silicon carbide (called SiSiC or RBSC containing 5 to 20% Si); porous re-crystallized silicon carbide (called RSiC); silicon graphite (C-SiC) constituted of graphite and covered by a layer of SiC for example of 0.1 to 1 mm thickness; as well as SiC/SiC composites, for example with fibres or "whiskers"; C/SiC composites, for example with fibres or "whiskers" of carbon and with a SiC matrix; also single crystals of SiC; and composites of SiC with another ceramic, for example $SiC/Si_3N_4$ composites and SiC/TiN. It was noted that, unexpectedly, the method according to the invention enabled brazing of composites with excellent results.

By silicon carbide based material, it is generally understood here to mean all the materials whose SiC content is greater than or equal to 80% by weight.

Nonetheless, certain materials to which the invention can be applied and which are mentioned in the examples above can have a silicon carbide content lower than 80%.

The two or more pieces to be assembled can be in a same material, SiC based, for example in PLS (PressureLess Sintered) α-SiC, or in SiC—SiC composite, or each of the pieces can be of a different material.

In order to add the SiC and/or C strengthening agent, it is also possible, for example, to coat the two surfaces of the pieces of SiC based materials with the aid of a powder of pure SiC and/or pure C, of the type such as those described above, put into suspension in an organic binder analogous to that mentioned above. It can, for example, be a solvent of the NICROBRAZ® type.

The surfaces of the areas of the pieces to be assembled are then coated with the brazing solder composition suspension (Si and metal), and next the surfaces put into contact. Alternatively, the surfaces of the areas of the pieces to be assembled can be put into contact, coated with the SiC and/or C suspension, and then the brazing solder composition suspension (Si plus metal) applied close to the joint formed by the two surfaces of the SiC based material put in contact and already coated with the strengthening agent suspension.

Another method for producing the filler, adding a strengthening agent of SiC and/or C, is to add particles of SiC and/or C to the brazing solder composition.

Furthermore, the strengthening agent can be added by inserting said strengthening agent of SiC and/or C between the pieces to be assembled.

In this case, the strengthening agent is preferably in the form of a fabric, a non-woven fabric, a felt, or a foam of SiC and/or C.

As examples of such fabrics, mention can be made of the carbon fabrics with the HEXCEL® trademark. The thickness of such strengthening agents, for example in fabric, is generally of from 100 µm to 500 pm, and their density is generally of from 100 to 700 gm/m². This thickness and this density are chosen in such a way that the mass proportions indicated above are respected, between the composition of the brazing solder (Si plus metal) and the strengthening agent of Si and/or C.

The pieces ready to be brazed are then placed in a furnace, under vacuum or in an inert gas atmosphere.

Generally, the vacuum is a high vacuum, meaning that the pressure is of from $10^{-3}$ Pa to $10^{-5}$ Pa, for example $10^{-4}$ Pa.

Preferably, the inert gas is argon.

The invention even makes it possible to use argon of commercial quality with a non-negligible partial pressure of oxygen.

First of all a first temperature stage is reached, allowing degassing of the assembly and evaporation of the binder, still called "unbinding"; whereas a second temperature stage enables the brazing itself.

The first stage is carried out, for example, at a temperature of from 200 to 300° C., preferably at 300° C., over a length of time for example of from 0.5 to 1 hour.

The second stage is carried out at a temperature corresponding to the fusion temperature of the brazing solder composition chosen, but this temperature is preferably a temperature at least 25° C. higher than the liquidus temperature of the composition.

Depending on the compositions, this liquidus temperature varies from 900° C. to 1820° C. The brazing temperature thus varies, for example, from 950° C. to 1850° C., and preferably from 1200° C. to 1850° C.

A further advantage of the method according to the invention is that such a fusion temperature of the compositions allows utilisation of the assembly, in particular in air up to 1000° C. and even as high as 1600° C.

According to the invention, the length of brazing time, that is the thermal cycle for producing the assembly, is generally short: the time needed for the temperature stage is for example less than 10 minutes and preferably of from 5 to 10 minutes.

Next the assembly is cooled down to ambient temperature at a rate, for example, of 5° C. per minute.

Assemblies of pieces of silicon carbide comprising joints prepared by the method according to the invention make it possible to produce high precision structures, apparatuses, and components of complex shapes possessing high working temperatures able to reach up to 1600° C.

It is known, in fact, that the mechanical properties of silicon carbide:

high hardness;

low expansion coefficient high breaking strength;

good thermal shock resistance; and very high conductivity, make it an essential material for present and future industrial applications at high temperature.

Furthermore, SiC shows very good chemical resistance to a variety of acids, including hydrofluoric acid and very good resistance to oxidation in air at high temperatures up to 1300° C.

All these properties make SiC a highly preferred material, in particular for producing ceramic exchangers for heat engineering and chemical engineering. Thus, among the applications of assemblies obtained by the method according to the invention, one can also mention heat exchangers, burners, reactors, pump fittings, furnace resistances under average air temperature, but also combustion chambers for vehicles, composites for the aeronautics industry together with all structures intended for corrosive environments at temperatures of up to 1600° C.

The high rigidity of SiC and its low density is also advantageous for applications in the space domain.

The invention will now be described by means of the following examples given evidently as illustrative but non-limiting examples.

The following examples are not exhaustive, but only aim at illustrating the method according to the invention, using various brazing solder compositions with different strengthening agents and different ceramics containing SiC. In fact, among the alloys mentioned above, several categories can be distinguished according to the metal used, which will provide different physical properties, including in particular the fusion temperature and the expansion coefficient.

Thus, the families of metals with similar behaviour are as follows: Ru and Ir; Pd, Pt and Rh; Co and Cr; V and Zr; Re; and Ce.

EXAMPLES OF THE INVENTION

Example 1

This example relates to the mechanical aspect of a bond between two pieces of PLS α-SiC (PressureLess Sintered α-SiC), meaning in α silicon carbide sintered without pressure, obtained by implementing the method according to the invention using a brazing composition of $Ru_2Si_3$, adding a powder strengthening agent of pure SiC representing 50% by weight of the brazing solder composition.

a) Preparation of the Brazing Solder Composition and Pieces to be Assembled:

The two SiC surfaces to be assembled are degreased in an organic solvent and then dried. The SiC surfaces are coated with pure SiC powder, STARCK® SiC powder of 98.5% purity and granulometry less than 10 μm, by means of an organic cement. The proportion of coated SiC powder is 50% by weight of the brazing solder powder $Ru_2Si_3$ below.

A powder of the compound $Ru_2Si_3$ pre-produced from the metals Ru and Si, is mixed with an organic binder which is a cement of the NICROBRAZ® type, and applied in the vicinity of the joint formed by the two coated SiC surfaces put into contact. The mass proportion between the $Ru_2Si_3$ powder applied externally to the joint, and the SiC strengthening agent, coated between the pieces is 100/50.

b) Brazing:

The two pieces of SiC ready to be brazed are placed in the furnace under a high vacuum. A first stage at 300° C. lasting 1 hour is carried out to eliminate the organic binder and then the brazing itself is carried out under the following conditions after argon entry:

brazing temperature: 1750° C.;
time of temperature stage: 5 min.;
atmosphere: argon.

The obtained assembly is then cooled down to ambient temperature at a rate of 5° C. per minute.

c) Mechanical Binding Test:

A mechanical test for shearing/compression was carried out on this binding. Breaking of the piece is higher than 193 MPa, for shearing alone.

Example 2

This example relates to the mechanical strength of a bond between two pieces of PLS α-SiC (PressureLess Sintered α-SiC), meaning in α silicon carbide sintered without pressure, obtained by implementing the method according to the invention using a brazing solder composition constituted of 42.5% by weight of Ru and 57.5% by weight of Si, adding a powder strengthening agent of pure SiC representing 5% by weight of the brazing solder composition.

a) Preparation of the Brazing Solder Composition and Pieces to be Assembled:

The two SiC surfaces to be assembled are degreased in an organic solvent and then dried.

The SiC surfaces are coated with pure SiC powder, STARCK® SiC powder of 98.5% purity and granulometry less than 10 μm, by means of an organic cement. The proportion of coated SiC powder is 5% by weight of the brazing solder powder below.

A powder of the compound $Ru_2Si_3$ pre-produced from the metals Ru and Si, is mixed with a powder of pure Si of trademark CERAC® of 99.99% purity and with granulometry less than 10 μm with the following mass proportions: 60% by weight of $Ru_2Si_3$ and 40% by weight of Si. This mixture corresponds to an overall composition of 42% by weight of Ru and 57.5% by weight of Si. The composition is mixed with an organic binder which is a cement of the NICROBRAZ® type and applied close to the joint formed by the two surfaces of coated SiC put into contact. The mass proportion between the the powder Ru 42.5% by weight—Si 57.5% by weight, applied externally to the joint, and the SiC strengthening agent coated between the pieces is 100/5.

b) Brazing:

The two pieces of SiC ready to be brazed are placed in the furnace under a high vacuum. A first stage at 300° C. lasting 1 hour is carried out to eliminate the organic binder and then the brazing itself is carried out under the following conditions:

brazing temperature: 1400° C.;
time of temperature stage: 5 min.;
high vacuum: $10^{-5}$ mbars The obtained assembly is then cooled down to ambient temperature at a rate of 5° C. per minute.

c) Mechanical Binding Test:

A mechanical test for shearing/compression was carried out on this binding. Breaking of the piece is higher than 256 MPa, for shearing alone.

Example 3

This example relates to the mechanical strength of a bond between two pieces of PLS α-SiC (PressureLess Sintered α-SiC), meaning in α silicon carbide sintered without pressure, obtained by implementing the method according to the invention using a brazing solder composition constituted of 77% by weight of Pt and 23% by weight of Si, adding a powder strengthening agent of pure SiC representing 30% by weight of the brazing solder composition.

a) Preparation of the Brazing Solder Composition and Pieces to be Assembled:

The two SiC surfaces to be assembled are degreased in an organic solvent and then dried.

The SiC surfaces are coated with pure SiC powder, trademark STARCK®, of 98.5% purity and granulometry less than 10 μm, by means of an organic cement. The proportion of coated SiC powder is 30% by weight of the brazing solder powder below. A powder of the compound PtSi pre-produced from the metals Pt and Si, is mixed with a powder of pure Si of trademark CERAC® of 99.99% purity and with granulometry less than 10 μm in the following mass proportions: 88.5% by weight of PtSi and 11.5% by weight of Si. This mixture corresponds to an overall composition of 77% by weight of Pt and 23% by weight of Si. The composition is mixed with an organic binder which is a cement of the NICROBRAZ® type and applied close to the joint formed by the two surfaces of coated SiC put into contact. The mass proportion between the composition Pt 77% by weight—Si 23% by weight, applied externally to the joint, and the SiC strengthening agent, coated between the pieces, is 100/30.

b) Brazing:

The two pieces of SiC ready to be brazed are placed in the furnace under a high vacuum. A first stage at 300° C. lasting 1 hour is carried out to eliminate the organic binder and then the brazing itself is carried out under the following conditions:

brazing temperature: 1200° C.;
time of temperature stage: 5 min.;
high vacuum: $10^{-5}$ mbars The obtained assembly is then cooled down to ambient temperature at a rate of 5° C. per minute.

c) Mechanical Binding Test:

A mechanical test for shearing/compression was carried out on this binding. Breaking of the piece is higher than 236 MPa, for shearing alone.

Example 4

This example relates to the mechanical strength of a bond between two pieces of PLS α-SiC (PressureLess Sintered α-SiC), meaning in α silicon carbide sintered without pressure, obtained by implementing the method according to the invention using a brazing solder composition constituted of 26.5% by weight of zirconium and 73.5% by weight of Si, adding a powder strengthening agent of pure SiC representing 5% by weight of the brazing solder composition.

a) Preparation of the Brazing Solder Composition and Pieces to be Assembled:

A commercial powder of the compound ZrSi$_2$ of trademark CERAC® of 99.5% purity and with granulometry lower than 45 μm was mixed with a pure Si powder of trademark CERAC® of 99.5% purity and granulometry lower than 10 μm in the following mass proportions; 43% by weight of ZrSi$_2$ and 57% by weight of Si. This mixture corresponds to an overall composition of 26.5% by weight of Zr and 73.5% by weight of Si. The two SiC surfaces to be assembled are degreased in an organic solvent and then dried. The SiC surfaces are coated with pure SiC powder, SiC powder of trademark STARCK®, of 98.5% purity and of granulometry lower than 10 μm by means of an organic cement. The proportion of coated SiC powder is 5% by weight of the brazing solder powder Zr 26.5% by weight—Si 73.5% by weight. The composition Zr 26.5% by weight—Si 73.5% by weight is mixed with an organic binder which is a cement of the NICROBRAZ® type and applied close to the joint formed by the two surfaces of coated SiC put into contact. The mass proportion between Zr 26.5% by weight—Si 73.5% by weight, applied externally to the joint, and the SiC strengthening agent coated between the pieces is 100/5.

b) Brazing:

The two pieces of SiC ready to be brazed are placed in the furnace. A first stage at 300° C. lasting 1 hour is carried out to eliminate the organic binder and then the brazing itself is carried out under the following conditions:

brazing temperature: 1400° C.;
time of temperature stage: 5 min.;
high vacuum: $10^{-5}$ mbars The obtained assembly is then cooled down to ambient temperature at a rate of 5° C. per minute.

c) Mechanical Binding Test:

A mechanical test for shearing/compression was carried out on this binding. There was no rupture, the mechanical aspect of the assembly being higher than 270 MPa, for shearing alone.

Example 5

This example relates to the mechanical strength of a bond between two pieces of C/SiC composite obtained by implementing the method according to the invention using a brazing solder composition constituted of 26.5% by weight of zirconium and 73.5% by weight of Si, adding a powder strengthening agent of pure SiC representing 5% by weight of the brazing solder composition.

a) Preparation of the Brazing Solder Composition and Pieces to be Assembled:

A commercial powder of the compound ZrSi$_2$ of trademark CERAC® of 99.5% purity and with granulometry lower than 45 μm was mixed with a pure Si powder of trademark CERAC® of 99.99% purity and with granulometry lower than 10 μm in the following mass proportions; 43% by weight of ZrSi$_2$ and 57% by weight of Si. This mixture corresponds to an overall composition of 26.5% by weight of Zr and 73.5% by weight of Si. The two C/SiC composite surfaces to be assembled are degreased in an organic solvent and then dried. The C/SiC surfaces are coated with pure SiC powder, SiC powder of trademark STARCK®, of 98.5% purity and of granulometry lower than 10 μm by means of an organic cement. The proportion of coated SiC powder is 5% by weight of the brazing solder powder Zr 26.5% by weight—Si 73.5% by weight. The brazing solder composition Zr 26.5% by weight—Si 73.5% by weight is mixed with an organic binder which is a cement of the NICROBRA® type and applied close to the joint formed by the two coated C/SiC surfaces put into contact. The mass proportion between Zr 26.5% by weight—Si 73.5% by weight, applied externally to the joint, and the SiC strengthening agent, coated between the pieces, is 100/5.

b) Brazing:

The two pieces of C/SiC composite ready to be brazed are placed in the furnace. A first stage at 300° C. lasting 1 hour is carried out to eliminate the organic binder and then the brazing itself is carried out under the following conditions:

brazing temperature: 1400° C.;
time of temperature stage: 10 min.;
high vacuum: $10^{-5}$ mbars The obtained assembly is then cooled down to ambient temperature at a rate of 5° C. per minute.

c) Mechanical Binding Test:

A mechanical test for shearing/compression was carried out on this binding. The rupture of the piece is greater than 40 MPa for shearing alone. It is to be noted that the junction is limited by the strength of the composite itself, since rupture takes place in the composite and not in the joint.

Example 6

This example relates to the mechanical strength of a bond between two pieces of PLS α-SiC (PressureLess Sintered α-SiC), meaning in α silicon carbide sintered without pressure, obtained by implementing the method according to the invention using a powder of $ZrSi_2$, adding a powder strengthening agent of pure SiC representing 50% by weight of the brazing solder composition.

a) Preparation of the Brazing Solder Composition and Pieces to be Assembled:

The two SiC surfaces to be assembled are degreased in an organic solvent and then dried. The SiC surfaces are coated with pure SiC powder, SiC powder of trademark STARCK®, of 98.5% purity and of granulometry lower than 10 μm by means of an organic cement. The proportion of coated SiC powder is 50% by weight of the following $ZrSi_2$ powder. The $ZrSi_2$ powder is mixed with an organic binder, which is a cement of the NICROBRAZ® type and applied close to the joint formed by the two surfaces of coated SiC put into contact. The mass proportion between $ZrSi_2$, applied externally to the joint, and the SiC strengthening agent coated between the pieces is 100/50.

b) Brazing:

The two pieces of SiC, ready to be brazed, are placed in the furnace under a high vacuum. A first stage at 300° C. lasting 1 hour is carried out to eliminate the organic binder and then the brazing itself is carried out under the following conditions:

brazing temperature: 1700° C.;
time of temperature stage: 10 min.;
atmosphere: argon The obtained assembly is then cooled down to ambient temperature at a rate of 5° C. per minute.

c) Mechanical Binding Test:

A mechanical test for shearing/compression was carried out on this binding. The rupture of the piece is higher than 150 MPa for shearing alone.

Example 7

This example relates to the mechanical strength of a bond between two pieces of PLS α-SiC (PressureLess Sintered α-SiC), meaning in α silicon carbide sintered without pressure, obtained by implementing the method according to the invention, using a brazing solder composition constituted of 43% by weight of cerium and 57% by weight of Si, adding a powder strengthening agent of pure SiC representing 10% by weight of the brazing solder composition.

a) Preparation of the Brazing Solder Composition and Pieces to be Assembled:

The two SiC surfaces to be assembled are degreased in an organic solvent and then dried. The SiC surfaces are coated with pure SiC powder by means of an organic cement of trademark STARCK®, of 98.5% purity and of granulometry lower than 10 μm. The proportion of coated SiC powder is 50% by weight of the composition below. A commercially available powder of the compound $CeSi_2$ trademark CERAC®, of 99.5% purity and granulometry lower than 10 μm, is mixed with a powder of pure Si of trademark CERAC®, of 99.5% purity and granulometry lower than 10 μm, in the following mass proportions: 59.3% by weight of $CeSi_2$ and 40.7% by weight of Si. This mixture corresponds to an overall composition of 43% by weight of Ce and 57% by weight of Si ($Ce_{43}Si_{57}$) This composition is mixed with an organic binder which is a cement of the NICROBRAZ® type and applied close to the joint formed by the two surfaces of coated SiC put into contact.

The mass proportion between Ce 43% by weight—Si 57% by weight, applied to the outside of the joint, and the SiC strengthening agent coated between the pieces is 100/10.

b) Brazing:

The two pieces of SiC, ready to be brazed, are placed in the furnace. A first stage at 300° C. for 1 hour is carried out to eliminate the organic binder and then the brazing itself is carried out under the following conditions:

brazing temperature: 1300° C.;
time of temperature stage: 5 min.;
high vacuum: $10^{-5}$ mbars The obtained assembly is then cooled down to ambient temperature at a rate of 5° C. per minute.

c) Mechanical Binding Test:

A mechanical test for shearing/compression was carried out on this binding. The strength of the assembly is greater than 195 MPa for shearing alone.

Example 8

This example relates to the mechanical strength of a bond between two pieces of PLS α-SiC (PressureLess Sintered α-SiC), meaning in α silicon carbide sintered without pressure, obtained by implementing the method according to the invention, using a brazing solder composition constituted of $Re_5Si_3$, adding a powder strengthening agent of pure SiC representing 50% by weight of the brazing solder composition.

a) Preparation of the Brazing Solder Composition and Pieces to be Assembled:

The two SiC surfaces to be assembled are degreased in an organic solvent and then dried. The SiC surfaces are coated with pure SiC powder, SiC powder of trademark STARCK®, of 98.5% purity and of granulometry lower than 10 μm, by means of an organic cement. The proportion of coated SiC powder is 50% by weight of the composition $Re_5Si_3$ below. A commercially available powder of the compound $Re_5Si_3$ of trademark GOODFELLOW®, of 99.5% purity and granulometry lower than 40 μm, is mixed with an organic binder which is a cement of the NICROBRAZ® type and applied close to the joint formed by the two surfaces of coated SiC put into contact. The mass proportion between the $Re_5Si_3$, applied externally to the joint, and the SiC strengthening agent coated between the pieces is 100/50.

b) Brazing:

The two pieces of SiC, ready to be brazed, are placed in the furnace under high vacuum. A first stage at 300° C. for 1 hour is carried out to eliminate the organic binder and then the brazing itself is carried out under the following conditions:

brazing temperature: 1800° C.;
time of temperature stage: 10 min.;
atmosphere: argon.

The obtained assembly is then cooled down to ambient temperature at a rate of 5° C. per minute.

c) Mechanical Binding Test:

A mechanical test for shearing/compression was carried out on this binding. The strength of the assembly is greater than 265 MPa for shearing alone.

Example 9

This example relates to the mechanical strength of a bond between two pieces of SiC/SiC composite, obtained by implementing the method according to the invention, using a brazing solder composition constituted of $Re_5Si_3$, adding a powder strengthening agent of pure SiC representing 50% by weight of the brazing solder composition.

a) Preparation of the Brazing Solder Composition and Pieces to be Assembled:

The two SiC/SiC composite surfaces to be assembled are degreased in an organic solvent and then dried. The SiC/SiC surfaces are coated with pure SiC powder, SiC powder of trademark STARCK®, of 98.5% purity and of granulometry lower than 10 μm by means of an organic cement. The proportion of coated SiC powder is 50% by weight of the composition of $Re_5Si_3$ below. A commercially available powder of the compound $Re_5Si_3$ trademark GOODFEL-LOW®, of 99.5% purity and granulometry lower than 40 μm, is mixed with an organic binder which is a cement of the NICROBRAZ® type and applied close to the joint formed by the two surfaces of SiC/SiC composite put into contact. The mass proportion between $Re_5Si_3$ applied externally to the joint, and the SiC strengthening agent coated between the pieces is 100/50.

b) Brazing:

The two pieces of composite, ready to be brazed, are placed in the furnace under high vacuum. A first stage at 300° C. for 1 hour is carried out to eliminate the organic binder and then the brazing itself is carried out under the following conditions:

brazing temperature: 1800° C.;
time of temperature stage: 5 min.;
atmosphere: argon.

The obtained assembly is then cooled down to ambient temperature at a rate of 5° C. per minute.

c) Mechanical Binding Test:

A mechanical test for shearing/compression was carried out on this binding. The rupture strength of the assembly is greater than 156 MPa for shearing alone.

The invention claimed is:

1. A non-reactive refractory brazing solder binary silicide composition selected from the group consisting of:
   a brazing solder composition consisting, in atomic percentages, of from 40 to 97% silicon and of from 60 to 3% rhenium;
   a brazing solder composition consisting, in atomic percentages, of from 45 to 97% silicon and of from 55 to 3% ruthenium;
   a brazing solder composition consisting, in atomic percentages, of from 48 to 97% silicon and of from 52 to 3% iridium; and
   a brazing solder composition consisting, in atomic percentages, of from 53 to 97% silicon and of from 47 to 3% cerium.

2. A composition for non-reactive refractory brazing of pieces of silicon carbide based materials, said composition comprising about 5 to 60% by weight of a strengthening agent of SiC and/or C, and a non-reactive brazing solder composition selected from the group consisting of the following compositions:
   a brazing solder composition comprising, in atomic percentages, of from 40 to 97% silicon and of from 60 to 3% rhenium;
   a brazing solder composition comprising, in atomic percentages, of from 45 to 97% silicon and of from 55 to 3% ruthenium;
   a brazing solder composition comprising, in atomic percentages, of from 48 to 97% silicon and of from 52 to 3% iridium;
   a brazing solder composition comprising, in atomic percentages, of from 53 to 97% silicon and of from 47 to 3% cerium;
   a brazing solder composition comprising, in atomic percentages, of from 55 to 97% silicon and of from 45 to 3% vanadium;
   a brazing solder composition comprising, in atomic percentages, of from 60 to 97% silicon and of from 40 to 3% zirconium;
   a brazing solder composition comprising, in atomic percentages, of from 50 to 97% silicon and of from 50 to 3% rhodium;
   a brazing solder composition comprising, in atomic percentages, of from 58 to 97% silicon and of from 42 to 3% cobalt.

3. Refractory joint obtainable by the method comprising assembling at least two pieces of silicon carbide based materials by non-reactive refractory brazing, wherein these pieces are put into contact with a non-reactive brazing solder composition and the assembly formed by the pieces and the brazing solder composition is heated to a brazing temperature sufficient to fuse the composition of the brazing solder in order to form a refractory joint, in which the non-refractory brazing composition is a binary silicide composition comprising, in atomic percentages, of from 40 to 97% silicon and of from 60 to 3% of another element chosen in the group consisting of rhenium, vanadium, ruthenium, iridium, rhodium, cobalt, cerium, and zirconium and wherein, before brazing, about 5 to 60% by weight of a strengthening agent of SiC and/or C is added to the brazing solder composition.

4. Assembly comprising at least two pieces of SiC based materials, obtainable by the method comprising assembling at least two pieces of silicon carbide based materials by non-reactive refractory brazing, wherein these pieces are put into contact with a non-reactive brazing solder composition and the assembly formed by the pieces and the brazing solder composition is heated to a brazing temperature sufficient to fuse the composition of the brazing solder in order to form a refractory joint, in which the non-refractory brazing composition is a binary suicide composition comprising, in atomic percentages, of from 40 to 97% silicon and of from 60 to 3% of another element chosen in the group consisting of rhenium, vanadium, ruthenium, iridium, rhodium, cobalt, cerium, and zirconium and wherein, before brazing, about 5 to 60% by weight of a strengthening agent of SiC and/or C is added to the brazing solder composition.

5. A non-reactive refractory brazing solder silicide composition selected from the group consisting of:
   a brazing solder composition consisting, in atomic percentages, of from 40 to 97% silicon and of from 60 to 3% rhenium;
   a brazing solder composition consisting, in atomic percentages, of from 45 to 97% silicon and of from 55 to 3% ruthenium;
   a brazing solder composition consisting, in atomic percentages, of from 48 to 97% silicon and of from 52 to 3% iridium; and
   a brazing solder composition consisting, in atomic percentages, of from 53 to 97% silicon and of from 47 to 3% cerium.

6. Refractory joint obtainable by the method comprising assembling at least two pieces of silicon carbide based materials by non-reactive refractory brazing, wherein these pieces are put into contact with a non-reactive brazing solder composition and the assembly formed by the pieces and the brazing solder composition is heated to a brazing temperature sufficient to fuse the composition of the brazing solder in order to form a refractory joint, in which the non-refractory brazing composition is a binary suicide composition comprising, in atomic percentages, of from 40 to 97% silicon and of from 60 to 3% of another element chosen in the group consisting of rhenium, vanadium, ruthenium, iridium, rhodium, cobalt, cerium, and zirconium and wherein, before brazing, about 5 to 60% by weight of a strengthening agent of SiC and/or C is placed close to and/or between the pieces to be assembled.

7. Assembly comprising at least two pieces of SiC based materials, obtainable by the method comprising assembling at least two pieces of silicon carbide based materials by non-reactive refractory brazing, wherein these pieces are put into contact with a non-reactive brazing solder composition and the assembly formed by the pieces and the brazing solder composition is heated to a brazing temperature sufficient to fuse the composition of the brazing solder in order to form a refractory joint, in which the non-refractory brazing composition is a binary silicide composition comprising, in atomic percentages, of from 40 to 97% silicon and of from 60 to 3% of another element chosen in the group consisting of rhenium, vanadium, ruthenium, iridium, rhodium, cobalt, cerium, and zirconium and wherein, before brazing, about 5 to 60% by weight of a strengthening agent of SiC and/or C is placed close to and/or between the pieces to be assembled.

* * * * *